(12) United States Patent
Fields

(10) Patent No.: US 7,281,740 B1
(45) Date of Patent: Oct. 16, 2007

(54) DEBRIS COLLECTION AND VEGETATION REMOVAL APPARATUS

(76) Inventor: Chris Fields, 39904 No. General Kearney Rd., Temecula, CA (US) 92591

( * ) Notice: Subject to any disclaimer, the term of this patent is extended or adjusted under 35 U.S.C. 154(b) by 154 days.

(21) Appl. No.: 11/087,352

(22) Filed: Mar. 23, 2005

(51) Int. Cl.
 A01B 1/00 (2006.01)
 B25J 1/02 (2006.01)

(52) U.S. Cl. ..................... 294/100; 294/50.7

(58) Field of Classification Search .............. 294/19.2, 294/50.6, 50.7, 50.8, 100, 1.4, 1.5
 See application file for complete search history.

(56) References Cited

U.S. PATENT DOCUMENTS

| | | | |
|---|---|---|---|
| 1,350,123 A * | 8/1920 | Theodore | 294/19.1 |
| 1,455,144 A | 5/1923 | Moors | |
| 1,466,168 A | 8/1923 | Holton | |
| 1,908,322 A | 5/1933 | Cook | |
| 2,250,313 A | 7/1941 | Petz | |
| 2,320,611 A * | 6/1943 | Kandle | 294/100 |
| 2,320,967 A * | 6/1943 | Dunkelberger | 294/100 |
| 2,594,908 A * | 4/1952 | Gaulke et al. | 294/86.14 |
| 2,947,564 A | 10/1960 | Winther | |
| 3,221,485 A | 12/1965 | Jenkins | |
| 3,481,641 A * | 12/1969 | Berger et al. | 294/100 |
| 4,575,143 A | 3/1986 | Nast | |
| 4,896,678 A | 1/1990 | Ogawa | |
| 5,154,465 A | 10/1992 | Pakosh | |
| 5,193,871 A | 3/1993 | Williams | |
| 5,317,939 A * | 6/1994 | Marinescu | 81/53.11 |
| 5,452,767 A | 9/1995 | Smotherman | |
| 5,469,923 A | 11/1995 | Visser | |
| 5,642,913 A * | 7/1997 | Brown | 294/100 |
| 6,016,876 A | 1/2000 | Rountree | |
| 6,305,322 B1 * | 10/2001 | Patel | 119/161 |
| 6,505,869 B2 | 1/2003 | Novotny | |

* cited by examiner

Primary Examiner—Dean J Kramer
(74) Attorney, Agent, or Firm—Dennis W. Beech

(57) ABSTRACT

The present invention may be used for debris collection and vegetation removal. An interior shaft may be slidably disposed in an exterior tubular shaft. The interior shaft may protrude out of a lower end of the exterior tubular shaft and a prong assembly may have a plurality of prongs oriented in a subtending direction may be attached at a lower end of the interior shaft. A tubular housing may be attached at the lower end of the exterior tubular shaft in a position to receive the plurality of prongs when the interior shaft may be pulled upwardly relative to the exterior tubular shaft.

10 Claims, 1 Drawing Sheet

DEBRIS COLLECTION AND VEGETATION REMOVAL APPARATUS

BACKGROUND OF THE INVENTION

This invention relates to apparatus for ground debris collection and vegetation removal. The new debris collection and vegetation removal apparatus may have a clamping mechanism that may include multiple gripping wires that may expand radially to encircle an object to be removed or gripped and then be closed to pick up the object.

Various types of weed pullers or debris collection devices may be known and may include apparatus having a head with multiple blades or pick up arms that extend downward to pick up objects. These devices may have a hollow stem or pole to which the head is attached at a bottom and a handle with an operating lever may be attached at the top. The blades or cutting elements may be positioned relative to a weed and the handle operated to close the cutting blades or pick up arms to extract the plant. The blades or pick up arms are generally rigid members for operation of the device. Other devices may include hollow poles with sharpened prongs or blades at the bottom to dig into the ground around a weed as part of the removal operation. The blades or rigid prongs may be forced into the ground to dig and cut to pull up a weed.

SUMMARY OF THE INVENTION

The present invention is directed to apparatus for debris collection and vegetation removal. An interior shaft may be slidably disposed in an exterior tubular shaft. The interior shaft may protrude out of a lower end of the exterior tubular shaft. A prong assembly may have a plurality of prongs oriented in a subtending direction and may be attached at a lower end of said interior shaft. A tubular housing may be attached at the lower end of the exterior tubular shaft in a position to receive the plurality of prongs when the interior shaft may be pulled upwardly relative to the exterior tubular shaft.

These and other features, aspects and advantages of the present invention will become better understood with reference to the following drawings, description and claims.

DETAILED DESCRIPTION

Figures 1, 2, 3:
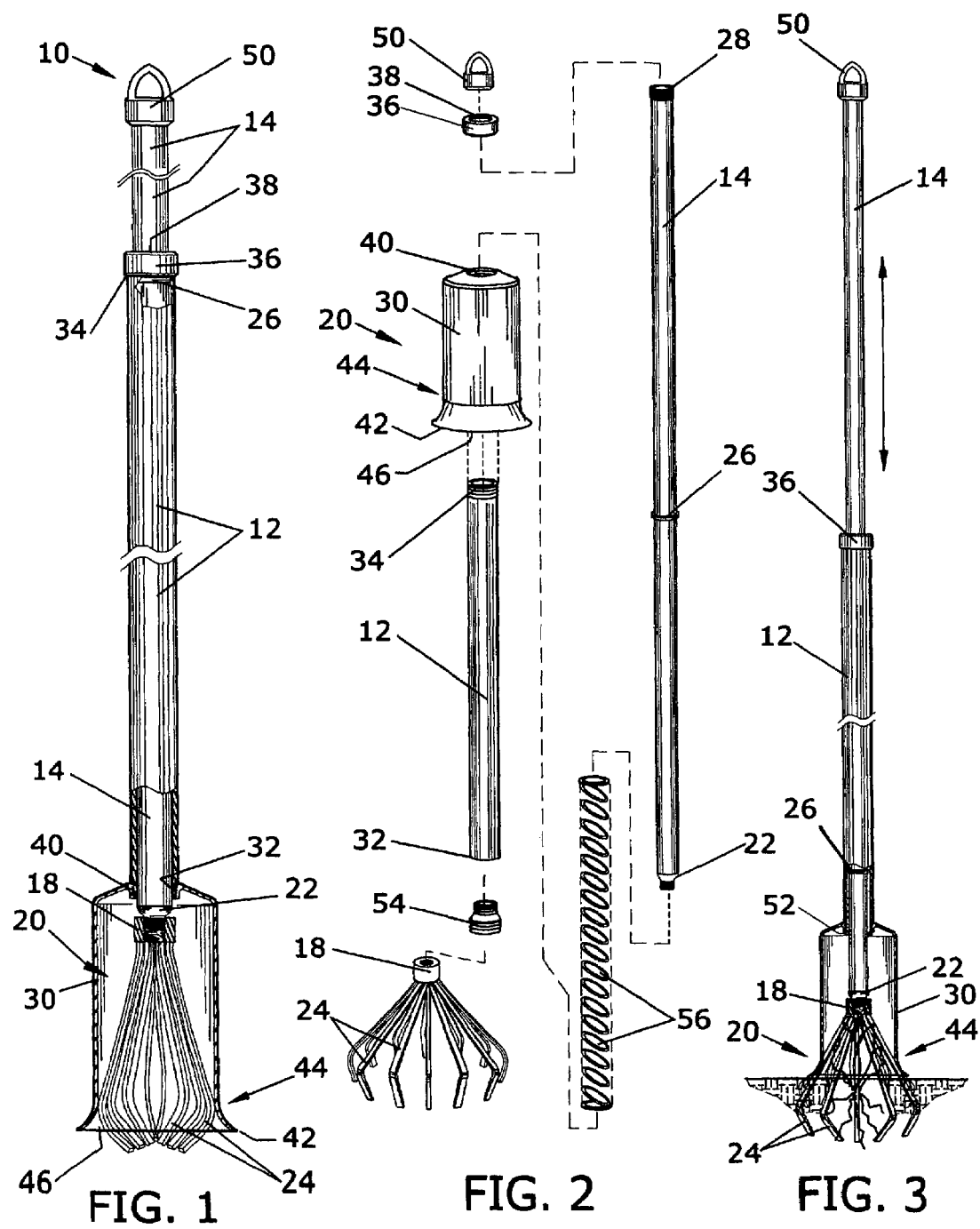
FIG. 1 illustrates a side elevation view of the apparatus according to an embodiment of the invention.
FIG. 2 illustrates a perspective exploded assembly view of the apparatus according to an embodiment of the invention.
FIG. 3 illustrates a side elevation view of the apparatus partially engaged in removing a weed from the ground according to an embodiment of the invention.

The following detailed description represents the best currently contemplated modes for carrying out the invention. The description is not to be taken in a limiting sense, but is made merely for the purpose of illustrating the general principles of the invention.

Referring to FIG. 1, a debris collection and vegetation removal apparatus 10 may have an exterior tubular shaft 12 and interior shaft 14 that may also be tubular form. The interior shaft 14 may be slidably disposed in exterior tubular shaft 12. A circular wire prong assembly 20 may be attached to the lower end 22 of the interior shaft 12 with the prongs 24 oriented in a downwardly direction. A prong assembly tubular housing 30 may be attached to the lower end 32 of the exterior tubular shaft 12 in position to receive the prongs 24 when the interior shaft 14 may be pulled upwardly relative to the exterior tubular shaft 12. The lower end 32 may be threaded on an exterior wall for attachment of tubular housing 30.

Referring to FIG. 2 the exterior tubular shaft 12 may have a threaded lower end 32 on an interior wall and a threaded upper end 34 for attachment of an end fastener 54 and a cap 36 that may have an aperture 38 that may allow the interior shaft 14 to be inserted through and slide through the cap 36. The tubular housing 30 may have a threaded aperture 40 for attachment to the end fastener 54. The tubular housing 30 may be flared outwardly or have a flange 42 at a bottom portion 44 to aid in receipt of prongs 24 when they may be pulled into the housing 30 through opening 46.

The interior shaft 14 have a stop ring 26 positioned on the shaft intermediate the lower end 22 and the upper end 28. The stop ring 26 may be positioned to restrain a spring 56 at a top end that may be slidably disposed on interior shaft 12. The spring 56 may be restrained at a bottom end by end fastener 54. The spring 56 may be biased to urge the interior shaft 14 upwardly relative to the exterior tubular shaft 12. The spring 56 may aid in pulling the prong assembly 20 upwardly and in retaining the prong assembly 20 in the tubular lousing 30. There may be a top closure 50 attached to upper end 28 that may have a ring for hanging the apparatus 10 for storage or for other use.

The prong assembly 20 may have a circular prong fastener 18 to which the upper end of the prongs 24 or tines may be attached. The prong fastener 18 may be attached to the lower end 22 of the interior shaft 14. The prongs 24 may be constructed of a resilient wire or flat metal material, as for example, flexible steel as may be used for a leaf rake, or other composite material. The prongs 24 may be attached to the prong fastener 18 to be biased in an open or radial extended configuration when not confined as when pulled into tubular housing 30, as best viewed in FIG. 2. The prongs 24 may have a radially inward curved lower portion to aid in griping vegetation and debris.

Referring to FIG. 3, in use, the extended prongs 24 may be forced or pushed into the ground to circle a plant such as a weed. The interior shaft 14 may be pulled upward relative to the exterior tubular shaft 12 thereby pulling the prongs 24 into the tubular housing 30. This may cause the lower end of the prongs 24 to close around the root of the weed such that the weed may be pulled out of the ground by raising the apparatus 10 upwardly. There may be a stop flange 52 at lower end 32 of the interior shaft 14 to stop the downward motion of the stop ring 26 to limit downward motion of interior shaft 14.

While the invention has been particularly shown and described with respect to the illustrated embodiments thereof, it will be understood by those skilled in the art that the foregoing and other changes in form and details may be made therein without departing from the spirit and scope of the invention.

I claim:

1. An apparatus for debris collection and vegetation removal comprising:
    an interior shaft slidably disposed in an exterior tubular shaft;
    said interior shaft protruding out of a lower end of said exterior tubular shaft and a prong assembly having a plurality of prongs oriented in a subtending direction is attached at a lower end of said interior shaft;

a tubular housing attached at said lower end of said exterior tubular shaft disposed to receive said plurality of prongs when said interior shaft is pulled upwardly relative to said exterior tubular shaft and said tubular housing at a bottom portion having an opening that has a diameter that is at least twice the diameter of a prong fastener;

a spring is slidably disposed on a lower portion of said interior shaft;

a stop ring is disposed on said interior shaft to restrain upward motion of a top end of said spring; and an end fastener is attached interior to said exterior tubular shaft at said lower end thereof to restrain downward motion of a bottom end of said spring.

2. The apparatus as in claim 1 wherein:

an upper end of said exterior tubular shaft having a cap with an aperture therein for passing said interior shaft therethrough; and said stop ring disposed around said interior shaft intermediate said cap and a lower end of said interior shaft wherein said stop ring may not pass through said aperture.

3. The apparatus as in claim 1 wherein said tubular housing having a threaded aperture at a top for threadable attachment to said lower end of said exterior tubular shaft.

4. The apparatus as in claim 1 wherein said tubular housing having a flange flared outwardly at said bottom portion having an said opening therein.

5. The apparatus as in claim 1 wherein there is a top closure for said interior shaft.

6. The apparatus as in claim 1 wherein:

said prong assembly having a circular prong fastener; and said prongs are attached at an upper end to said circular prong fastener biased in a radially extended position.

7. The apparatus as in claim 1 wherein said prongs are constructed of a resilient, flexible material to allow forcing said prongs into a plant growing material and closing said prongs about an object.

8. The apparatus as in claim 1 wherein said prongs have a radially inward curved lower portion.

9. The apparatus as in claim 1 wherein a lower end of said exterior tubular shaft having a stop flange at a lower end disposed to stop the downward motion of said stop ring disposed on said interior shaft.

10. The apparatus as in claim 1 wherein said end fastener having a threaded lower portion for threadable engagement of a threaded aperture of said tubular housing.

* * * * *